(12) United States Patent
Donescu

(10) Patent No.: US 7,330,560 B2
(45) Date of Patent: Feb. 12, 2008

(54) INSERTION AND EXTRACTION OF A MESSAGE IN AN IMAGE

(75) Inventor: Ioana Donescu, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 10/461,416

(22) Filed: Jun. 16, 2003

(65) Prior Publication Data

US 2004/0146178 A1 Jul. 29, 2004

(30) Foreign Application Priority Data

Jun. 19, 2002 (FR) .................................. 02 07558

(51) Int. Cl.
  *G06K 9/00* (2006.01)
  *H04L 9/00* (2006.01)
(52) U.S. Cl. ...................... 382/100; 713/176
(58) Field of Classification Search ................ 382/100; 713/176; 358/3.28
  See application file for complete search history.

(56) References Cited

U.S. PATENT DOCUMENTS

| 5,636,292 | A | 6/1997 | Rhoads |
| 6,198,832 | B1 * | 3/2001 | Maes et al. .................. 382/100 |
| 6,738,492 | B1 * | 5/2004 | Kondo et al. ................ 382/100 |
| 2001/0032315 | A1 | 10/2001 | Van Overveld et al. .... 713/176 |
| 2002/0066019 | A1 | 5/2002 | Amonou et al. |
| 2002/0124174 | A1 | 9/2002 | Ehrmann-Patin et al. |
| 2002/0141612 | A1 | 10/2002 | Donescu |
| 2004/0103101 | A1 * | 5/2004 | Stubler et al. .............. 707/100 |
| 2004/0133927 | A1 * | 7/2004 | Sternberg et al. ........... 725/136 |

FOREIGN PATENT DOCUMENTS

FR       2 789 783        8/2000

OTHER PUBLICATIONS

"Geometric Distortion Correction Through Image Normalization," M. Alghoniemy, et al., Proc. ICME (New York, Aug. 2000), IEEE, 2000, pp. 1291-1294.

"Evaluation of Interest Point Detectors" C. Schmid, et al., International Journal of Computer Vision, vol. 37, No. 2, Jun. 2000, pp. 151-172.

"On Resolving Rightful Ownerships of Digital Images by Invisible Watermarks," W. Zeng, et al., Proc. ICIP (Dallas, Texas, Nov. 1997), IEEE, 1997, pp. 552-555.

(Continued)

*Primary Examiner*—Brian Werner
*Assistant Examiner*—Anthony Mackowey
(74) *Attorney, Agent, or Firm*—Fitzpatrick, Cella, Harper & Scinto

(57) ABSTRACT

The invention concerns a method of inserting a message in an image, characterized in that it comprises the steps of:

selecting a set of points in the image as a function of predetermined criteria, so as to form a coordinate system in the image, calculating (S21) an affine transformation between a predetermined coordinate system and the coordinate system formed in the image, generating (S24) a pseudo-random sequence for each symbol of the message to be inserted, in the predetermined coordinate system, projecting (E25) each pseudo-random sequence into the coordinate system formed in the image, by affine transformation, inserting (S27) each symbol of the message to be inserted, as a function of its respective projected pseudo-random sequence.

25 Claims, 10 Drawing Sheets

OTHER PUBLICATIONS

"A Perceptually Tuned Subband Image Coder Based on the Measure of Just-Noticeable-Distortion Profile," C. Chou, et al., IEEE Transactions on Circuits and Systems for Video Technology, vol. 5, No. 6, Dec. 1995, pp. 467-476.

Bas et al.: "Image watermarking: an evolution to content based approaches," Pattern Recognition, Pergamon Press Inc., Elmsford, N.Y., US vol. 35, No. 3, Mar. 2002, pp. 545-561.

Neil F. Johnson et al.: "Recovery of Watermarks from Distorted Images," Information Hiding. International Workshop Proceedings, vol. 1768, Sep. 1999, pp. 318-332.

Mehmet U. Celik et al.: "Analysis of feature-based geometry invariant watermarking," Proceedings of the SPIE, SPIE, Bellingham, VA, US, vol. 4314, No. 4314, Jan. 22, 2001, pp. 261-268.

* cited by examiner

INSERTION AND EXTRACTION OF A MESSAGE IN AN IMAGE

BACKGROUND OF THE INVENTION

1. Field of the Invention

The present invention concerns a method of inserting a message such as a secret mark in a digital signal.

It also concerns a method of extracting a message inserted in a digital signal.

2. Description of the Related Art

In a complementary manner, the present invention concerns a device for inserting a message and a device for extracting the message, adapted respectively to implement the insertion and extraction methods according to the invention.

The digital signal considered hereinafter will more particularly be a digital image signal.

The message insertion envisaged in the context of the invention lies within the technical field of the watermarking of digital data, which can be interpreted as the insertion of a seal in the digital data, making it possible for example to authenticate the content of a digital data file. This watermarking is also referred to as digital tattooing.

Watermarking entails in general terms the modification of coefficients representing the digital image. This modification is imperceptible to the eye, but can be decoded by an appropriate decoder.

The general aspects of watermarking are set out in particular by I. J. Cox, M. L. Miller and J. A. Bloom in "Digital watermarking", Morgan Kaufmann Publishers, Academic Press, 2002.

The present application is concerned with the robust insertion of a message.

The insertion of a message is said to be robust if the message can later be extracted even if the image has undergone geometric distortions such as the cropping of a part of the image, a change of scale or rotation.

Solutions have been proposed for obtaining such robustness. A first category of solutions consists in preserving a reference of the position, of the size and of the orientation of the original image.

On extraction of the message, a prior phase of re-localizing is necessary, consisting of finding the reference again.

The document U.S. Pat. No. 5,636,292 proposes implementation of a method with re-localizing.

In this document, a signal preserving the reference information is inserted as the second watermarking signal. More particularly, a recognizable pattern is inserted in the magnitude information of the DFT (Discrete Fourier Tranform) transformed field. This field of representation of the image is invariable with respect to translations and cropping. The pattern serves later for re-localizing in case of change of scale or rotation of the image.

The inserted reference signal is a watermarking signal, and its use thus reduces the capacity of the image considered.

A second category of solutions consists of applying a watermarking method which is invariable with respect to geometrical transformations.

For example, the document by M. Alghoniemy and A. Tewfik entitled "Geometric distortion correction through image normalization" in Proc. ICME, New York, August 2000, proposes to normalize the image prior to the insertion of the message. Next, the same operation of normalization is carried out prior to the extraction of the message. The insertion and extraction are thus performed in the same normalized space, determined by invariable moments of the image.

These supplementary steps of normalization give rise to visual distortions in the image. Moreover, by that method, the insertion is not robust to cropping of the image.

SUMMARY OF THE INVENTION

The object of present invention is to remedy the drawbacks of the prior art, by providing a method and a device for message insertion in an image which is robust to geometric distortions such as cropping, change of scale or rotation, while not requiring supplementary information for extraction.

To that end, the invention provides a method of inserting a message in an image, characterized in that it comprises the steps of:

selecting a set of points in the image as a function of predetermined criteria, so as to form a coordinate system in the image, calculating an affine transformation between a predetermined coordinate system and the coordinate system formed in the image, generating a pseudo-random sequence for each symbol of the message to be inserted, in the predetermined coordinate system, projecting each pseudo-random sequence into the coordinate system formed in the image, by affine transformation, inserting each symbol of the message to be inserted, as a function of its respective projected pseudo-random sequence.

In a complementary manner, the invention relates to a device for the insertion of a message in an image, characterized in that is comprises:

means for selecting a set of points in the image as a function of predetermined criteria, so as to form a coordinate system in the image, means for calculating an affine transformation between a predetermined coordinate system and the coordinate system formed in the image, means for generating a pseudo-random sequence for each symbol of the message to be inserted, in the predetermined coordinate system, means for projecting each pseudo-random sequence in the coordinate system formed in the image, by affine transformation, means for inserting each symbol of the message to be inserted, as a function of its respective projected pseudo-random sequence.

The invention makes it possible to perform a message insertion in an image which is robust to geometric distortions such as cropping, change of scale or rotation, while not requiring supplementary information for extraction.

According to a preferred feature, the selecting step comprises:

detecting a first set of interest points, the first set comprising a first number of points, the interest points being ordered, selecting the points of the coordinate system formed in the image, among the points of interest, the coordinate system comprising a second number of points less than or equal to the first number of points, verifying that the points of the coordinate system formed in the image are the first interest points, and if the response is negative, modifying the image around the points of the coordinate system formed in the image, such that an additional detection of a second set of interest points, the second set comprising the second number of points, provides the points of the coordinate system formed in the image.

The object of these operations is to make it possible to retrieve the same coordinate system in the image at the time of later extraction, as that used for the insertion.

According to a another preferred feature, the method of insertion further comprises the steps of:

detecting a third set of interest points in the image in which the message has been inserted, the third set comprising the same number of points as the coordinate system formed in the image, comparing the interest points of the third set with the points of the coordinate system formed in the image, and, if there is no identity between the interest points of the third set and the points of the coordinate system formed in the image, modifying the image in which the message has been inserted, in order for there to be identity between the interest points of the third set and the points of the coordinate system formed in the image.

Here too, the object is to ensure that the same coordinate system formed in the image can be found again at the time of the later extraction.

According to a preferred feature, the modification of the image is a low-pass filtering operation around the interest points which are not in the coordinate system formed in the image. Alternatively, the modification of the image is a high-pass filtering operation around the points of the coordinate system formed in the image.

These modifications are simple to implement, and easily respect the constraints of non-modification of the visual aspect of the image.

According to a preferred feature, the method of insertion further comprises the step of applying a distortion to the image in which the message has been inserted, prior to the detection of a third set of interest points.

Thus the robustness if the insertion is improved.

According to alternative preferred features:

generating a pseudo-random sequence comprises generating a pseudo-random sample for each point of the image, the sample being determined as a function of the coordinates of the point in the predetermined coordinate system or generating a pseudo-random sequence comprises generating a series of pseudo-random numbers and associating these numbers with the points of the image in a spiral scanning path starting with the origin of the predetermined coordinate system.

Thus, the pseudo-random sequence generated is insensitive to the cropping or change of scale of the image.

According to a preferred feature, the insertion of a given symbol is carried out by the addition of the projected pseudo-random sequence corresponding to said given symbol, the pseudo-random sequence having been modulated by the symbol, and the insertion is carried out over the entire image except in the neighborhood of the points of the coordinate system formed in the image.

The insertion of the symbol is thus robust to the cropping of a part of the image.

The insertion device comprises means for implementing the features presented above.

The invention also concerns a method of extracting a message inserted in an image by the method presented above, characterized in that it includes the steps of:

selecting a set of points in the image as a function of predetermined criteria, so as to form a coordinate system in the image, calculating an affine transformation between the coordinate system formed in the image and a predetermined coordinate system, generating a pseudo-random sequence for each symbol of the message to be extracted, in the predetermined coordinate system, projecting each pseudo-random sequence into the coordinate system formed in the image, by reverse affine transformation, extracting each symbol of the message, as a function of its respective projected pseudo-random sequence.

According to a preferred feature, the extraction comprises calculating a detection value for each symbol to be extracted and comparing the detection value with a predetermined threshold.

This mode of detection is simple to implement.

According to a preferred feature, the extraction comprises a plurality of detection tests and the taking into account of the best test, for each symbol to extract.

The extraction is thus more reliable.

The invention also concerns an extraction device which comprises means for implementing the above features.

The insertion device and the extraction method and device have similar advantages to those already set out.

The invention also relates to a digital apparatus including the device according to the invention or means for implementing the method according to the invention. This digital apparatus is for example a digital camera, a digital camcorder, a scanner, a printer, a photocopier, or a fax machine. The advantages of the device and of the digital apparatus are identical to those already set out.

The invention also relates to an information storage means, which can be read by a computer or microprocessor, integrated or not into the device, and possibly removable, storing a program implementing the method according to the invention.

The invention also relates to a computer program readable by a microprocessor, comprising one or more sequences of instructions and capable of implementing the methods according to the invention.

BRIEF DESCRIPTION OF THE DRAWINGS

The features and advantages of the present invention will appear more clearly from a reading of a preferred embodiment illustrated by the accompanying drawings, in which.

DETAILED DESCRIPTION OF THE PREFERRED EMBODIMENT

Figure 1:
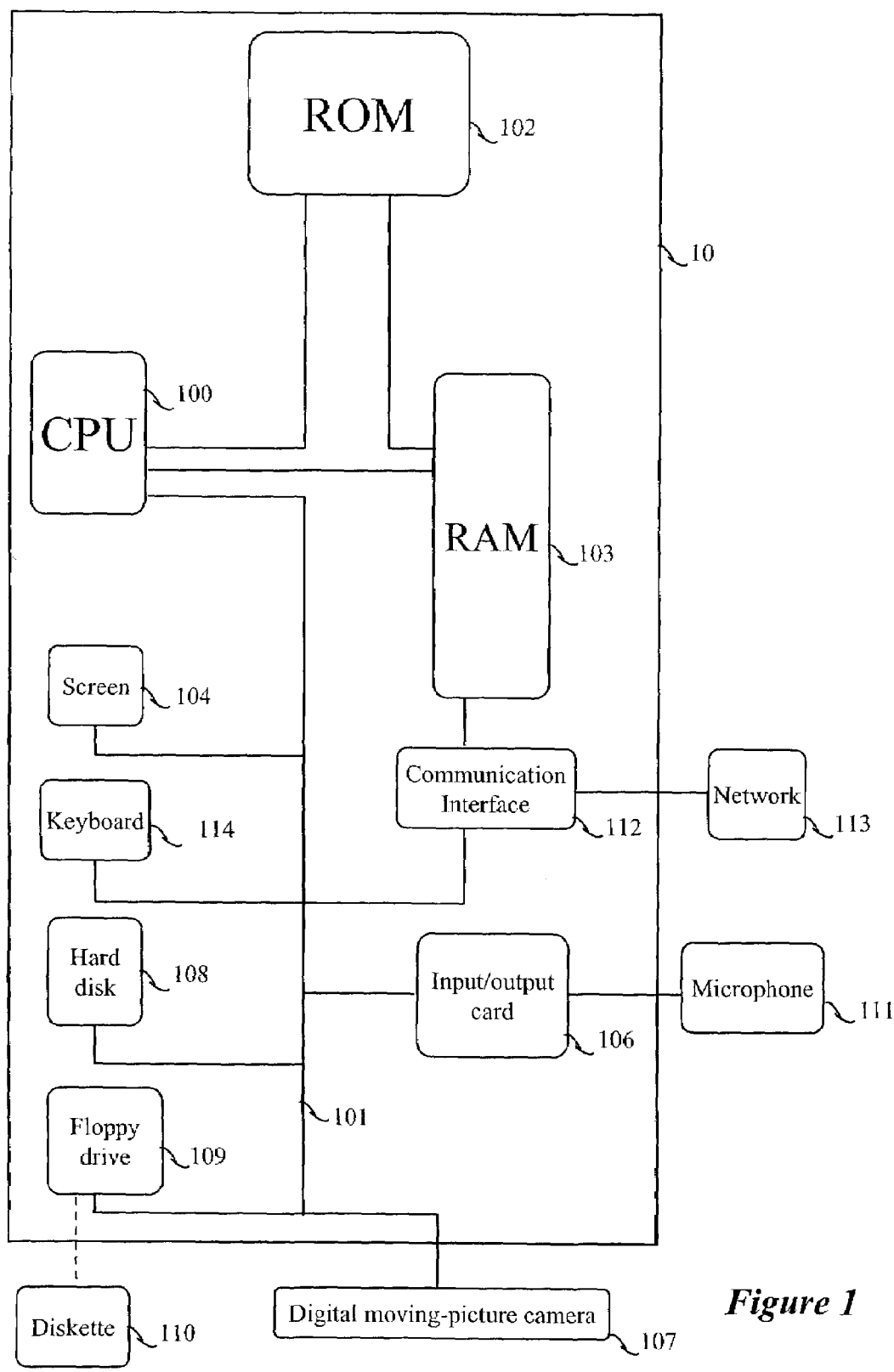
FIG. 1 is an embodiment of a device implementing the invention.

According to the chosen embodiment shown in FIG. 1, a device implementing the invention is for example a microcomputer 10 connected to different peripherals, for example a digital moving picture camera 107 (or a scanner, or any means of acquiring or storing an image) connected to a graphics card and supplying information to be processed according to the invention.

The device 10 comprises a communication interface 112 connected to a network 113 able to transmit digital data to be processed or conversely to transmit data processed by the device. The device 10 also comprises a storage means 108 such as a hard disk. It also comprises a drive 109 for a disk 110. This disk 110 may for example be a diskette, a CD-ROM, or a DVD-ROM. The disk 110 like the hard disk 108 can contain data processed according to the invention as well as the program or programs implementing the invention which, once read by the device 10, will be stored on the hard disk 108. According to a variant, the program enabling the device to implement the invention can be stored in read-only memory 102 (referred to as ROM in the drawing). In a second variant, the program can be received in order to be stored in an identical fashion to that described previously via the communication network 113.

The device 10 is connected to a microphone 111. The data to be processed according to the invention will in this case be audio signal.

This same device has a screen 104 for displaying the data to be processed or serving as an interface with the user, who can thus parameterize certain processing modes, using the keyboard 114 or any other means (a mouse for example).

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and which may possibly be removable, stores a program implementing the method according to the invention.

The communication bus 101 affords communication between the different elements included in the microcomputer 10 or connected to it. The representation of the bus 101 is not limiting and, in particular, the central processing unit 100 is able to communicate instructions to any component of the microcomputer 10 directly or by means of another element of the microcomputer 10.

Figure 2:
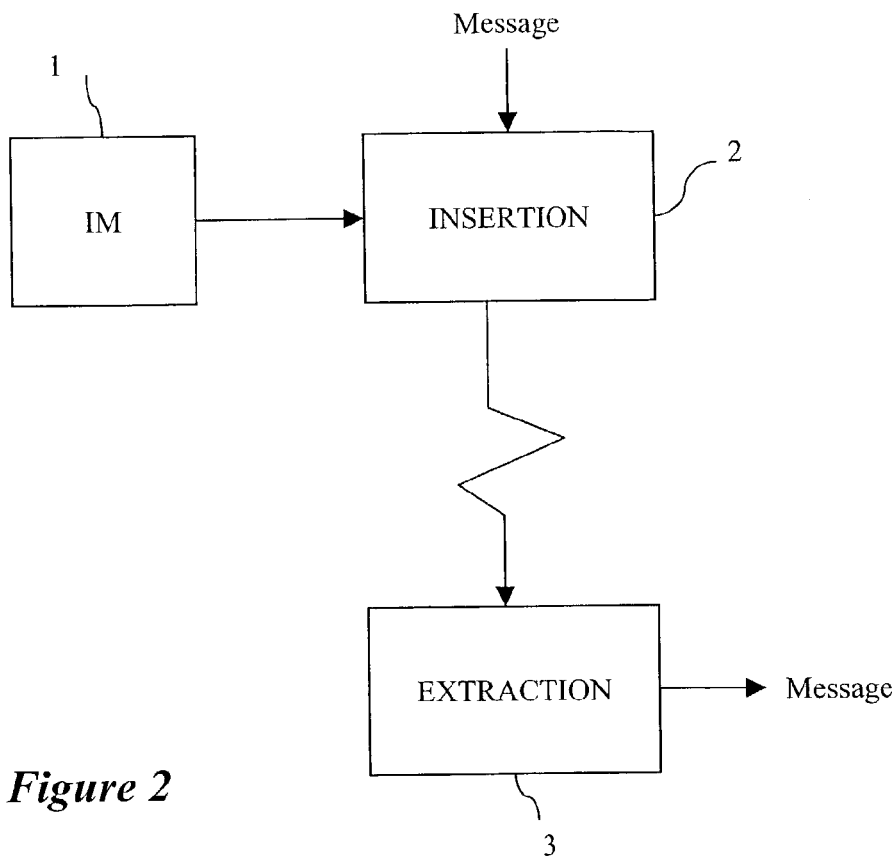
FIG. 2 shows an encoding device according to the invention and a corresponding decoding device.

An embodiment of a device for inserting a message in an image according to the invention is described with reference to FIG. 2. The insertion device is integrated into an apparatus, which is for example a digital camera, a digital camcorder, a scanner, a printer, a photocopier, a fax machine, a system of database management, or a computer.

The digital image IM is supplied by a source 1. The image IM is constituted by a series of digital samples. An original image IM may be represented by a series of pixels encoded for example over 8 bits or a byte. The black and white image IM may thus be decomposed in the spatial domain into a set of coefficients having 256 levels of gray, each coefficient value representing a pixel of the image IM.

The message to be inserted is formed of alphanumerical characters transformed into a binary code.

In general terms, an insertion device may be assimilated to an encoder which encodes a message in an image IM. A watermarked image I' is output from the encoder 2.

The insertion device according to the invention comprises:

means for selecting a set of points in the image as a function of predetermined criteria, so as to form a coordinate systemin the image, means for calculating an affine transformation between a predetermined coordinate system and the coordinate system formed in the image, means for generating a pseudo-random sequence for each symbol of the message to be inserted, in the predetermined coordinate system, means for projecting each pseudo-random sequence in the coordinate system formed in the image, by affine transformation, means for inserting each symbol of the message to be inserted, as a function of its respective projected pseudo-random sequence.

The operation of the insertion device will be detailed in what follows.

The image I' may undergo different processing operations, such as compression and decomposition or geometric distortions: cropping, change of scale or rotation for example.

The image I' is supplied to a decoder 3, which performs the extraction of the message.

The extraction device according to the invention comprises:

means for selecting a set of points in the image as a function of predetermined criteria, so as to form a coordinate systemin the image, means for calculating an affine transformation between the coordinate system formed in the image and a predetermined coordinate system, means for generating a pseudo-random sequence for each symbol of the message to be extracted, in the predetermined coordinate system, means for projecting each pseudo-random sequence in the coordinate system formed in the image, by reverse affine transformation, means for extracting each symbol of the message, as a function of its respective projected pseudo-random sequence.

The operation of the extraction device will be detailed hereinafter.

Figure 3:
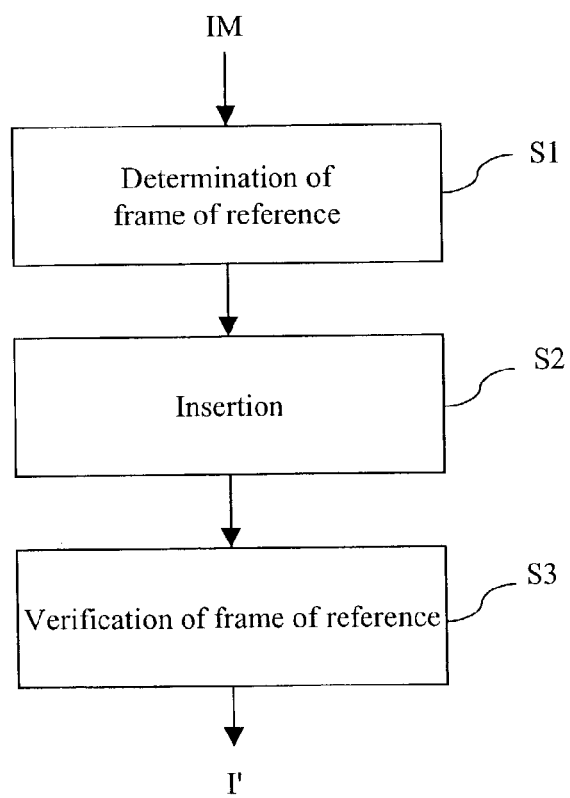
FIG. 3 is an embodiment of an encoding method according to the invention.

FIG. 3 shows an embodiment of a method of message insertion in an image IM, according to the invention. This method is implemented in the insertion device and comprises the steps S1 to S3.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S1 is the determination of a coordinate system R which depends on the image to be processed. This step will be detailed below.

The following step S2 is the actual insertion of the message in the image. This insertion uses the previously determined coordinate system R. This step will be detailed below.

The following step S3 is optional. Its purpose is to verify that the insertion of the message has not interfered with the determination of the coordinate system of the image. It is possible to take into account other distortions, to ensure robustness in relation to the determination of the coordinate system at the time of decoding later on.

Figure 4:
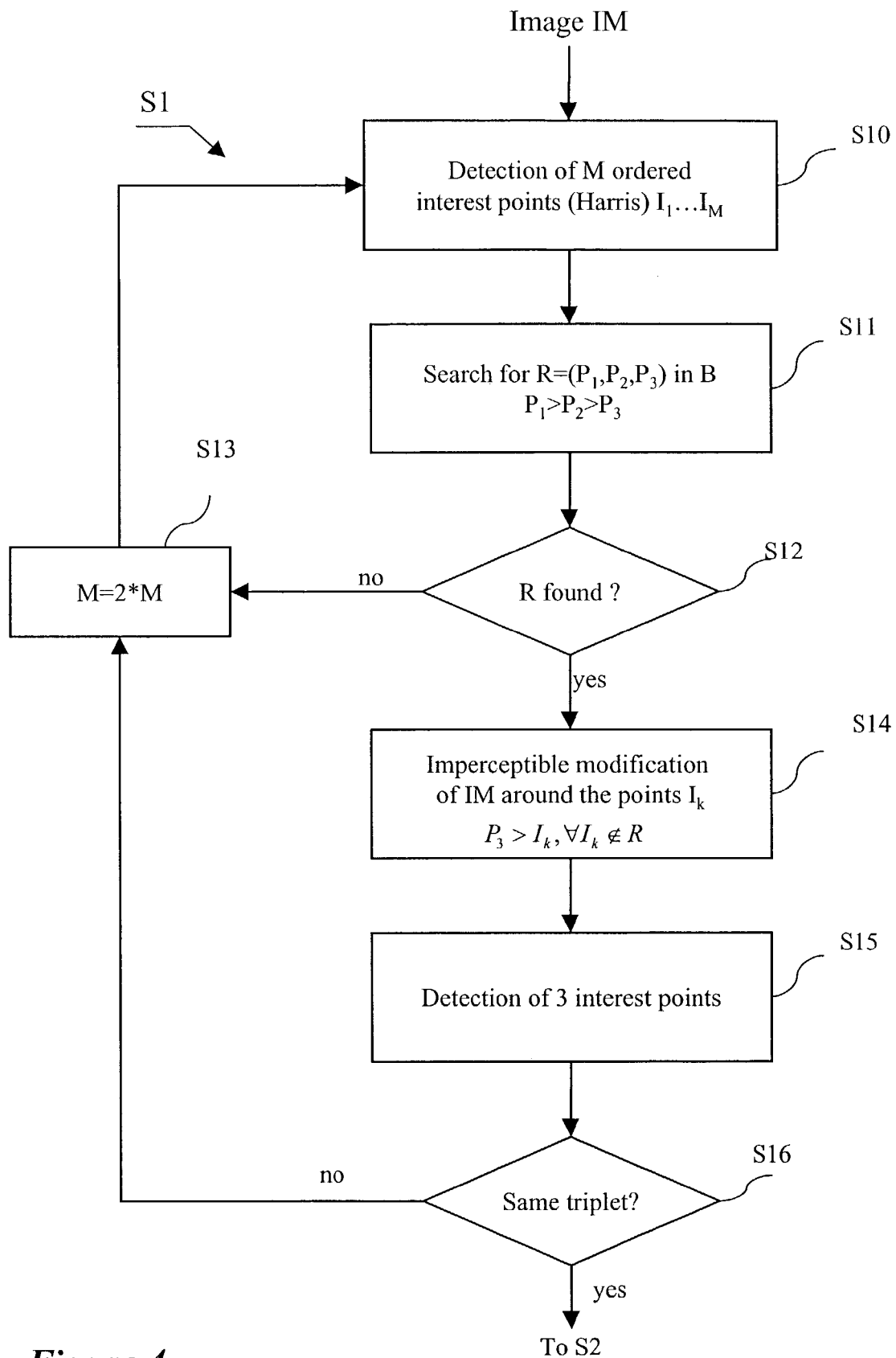
FIG. 4 is an embodiment of a method of determining a coordinate system in an image, included in the encoding method.

Step S1 of determining a coordinate system in the image IM is now detailed with reference to FIGS. 4 and 5. FIG. 4 is an algorithm comprising steps S10 to S16. The object of this algorithm is to determine a coordinate system which depends on the image, which it will be possible to find again later at the time of the extraction of the message and which is robust to a certain number of foreseeable distortions of the image.

A coordinate system is for example defined by three points, which makes it possible to achieve robustness to affine transformations defined by six parameters.

Step S10 is the selection of M points of the image, where M is an integer greater than three, and for example equal to twelve.

For this, interest points or salient points are chosen in the image, which are points where a plurality of outlines meet. Mathematically, this is expressed by the fact that at these points the gradient of the function which defines the values of the image at each pixel is high in more than one direction.

To detect a plurality of salient points, for example the method used is that of Harris and Stephens described in the article entitled "Evaluation of interest point detectors" by C. Schmid, R. Mohr and Bauckhage, which appeared in the International Journal of Computer Vision, 37(2):151-172, 2000.

This method is based on a calculation of the gradient of the image in a plurality of directions. A score qualifying the strength of the gradient in a plurality of directions is associated with each point. The M points having the highest scores are selected and are ordered according to their score. As a variant, it is possible to give preference to one direction with respect to another at the time of calculating the scores of the interest points.

The following step S11 is the selection of three points $P_1$, $P_2$, and $P_3$ from the M points previously determined. These points form the coordinate system of the image. Their order is determined by their score.

For this, a plurality of constraints are taken into account.

The points are selected in a window B. The window B is determined either automatically, or by a user. In the case in which the window B does not contain three interest points, the step S10 of determining interest points is reiterated with a higher number M.

The first point $P_1$ of the coordinate system is the interest point $I_k$ in the window B which has the highest score.

A second point $I_m$ is selected in the window B, such that the point $I_m$ satisfies the following relationship:

$$\forall\, q \in \{1, M\},\ q \neq k,\ |P_1 I_m - c \cdot D_0| \leq |P_1 I_q - c \cdot D_0|$$

The point $I_m$ chosen is thus at a distance close to $c \cdot D_0$ of the point $P_1$.

The parameter $D_0$ is an integer which defines a predetermined coordinate system of reference, in number of pixels. The predetermined coordinate system is for example orthonormalized, which simplifies the calculations. Let N1, N2 and N3 be the three points which define the orthonormalized coordinate system (FIG. 5). Their coordinates in the orthonormalized coordinate system are: N1(0,0), N2(0, $D_0$) and N3($D_0$, 0).

Figure 5:
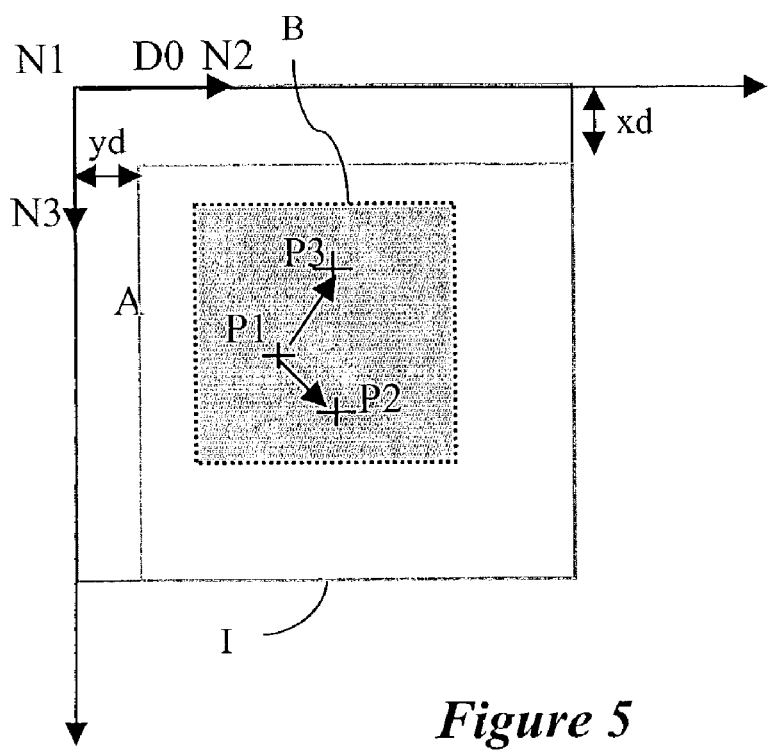
FIG. 5 represents a coordinate system in an image and a predetermined coordinate system.

As represented in FIG. 5, the coordinate system of reference has been placed in the upper left corner of the image IM. This naturally is simply a matter of choice and the coordinate system of reference could be situated elsewhere.

The number c is a constant, for example equal to 1 or 0.5. The choice of the number c is related to the robustness to decoding of each symbol inserted. The number c furthermore influences the calculation complexity of the method, since it determines the sampling density in the spatial domain.

The third point $I_n$ is chosen in the window B, such that it is at a distance close to $c \cdot D_0$ of the point $P_1$ and such that the angle between $P_1 I_m$ and $P_1 I_n$ is not too small.

This is expressed by the formula:

$$\forall\, q \in \{1, M\},\ q \neq k,$$

$$(k_1 \cdot |P_1 I_n / c \cdot D_0 - 1| + k_2 \cdot \cos(P_1 I_n, P_1 I_m)) \leq (k_1 \cdot |P_1 I_q / c \cdot D_0 - 1| + k_2 \cdot \cos(P_1 I_q, P_1 I_m))$$

The numbers $k_1$ and $k_2$ are constants which serve to weight the influence of each of the factors.

When the points $I_m$ and $I_n$ are determined, they are ordered according to their scores. If the score of $I_m$ is greater than that of $I_n$, then $P_2 = I_m$ and $P_3 = I_n$. In the opposite case, $P_2 = I_n$ and $P_3 = I_m$.

The following step S12 is a test to determine whether the coordinate system R has been determined.

If the response is negative, This step is followed by the step S13 at which the number of interest points is multiplied by two. Step S13 is followed by the previously described step S10.

When, the response is positive at step S12, this step is followed by the step S14 at which it is verified if the points of the previously determined coordinate system are the first three interest points, as a function of the scores of the interest points. Account is taken of the order between the points $P_1$, $P_2$ and $P_3$.

If that is not the case, the image around the interest points which are not within the coordinate system R is modified imperceptibly to reduce their interest point score. The modification is for example a local low-pass filtering around these points. In order for the modifications not to be visible, a visual mask is applied such as the one calculated a step S20 of FIG. 6 which will be described in what follows.

It is also possible to increase the score of the points of the coordinate system R by increasing the contrast locally around these points by a high-pass filtering operation, while remaining below the threshold of visibility.

At the following step S15, the three interest points are sought, as at step S10, in the modified image.

The following step S16 is a verification to determine whether the search in a coordinate system in the initial image and the search for three interest points in the modified image provide the same triplet of points. The object of this step is to ensure that the decoder will be able to find the coordinate system again without any supplementary information.

If the response is negative, then step S16 is followed by step S13 already described. New points $P_2$ and $P_3$ will then be determined. These new points may be in a region of the image where it is possible to modify the signal more in such a manner as to sufficiently increase their score.

Of course, a stopping criterion makes it possible to quit the loop, for example by setting a maximum threshold for the number M of interest points.

When the response is positive at step S16, the coordinate system R is determined.

Figure 6:
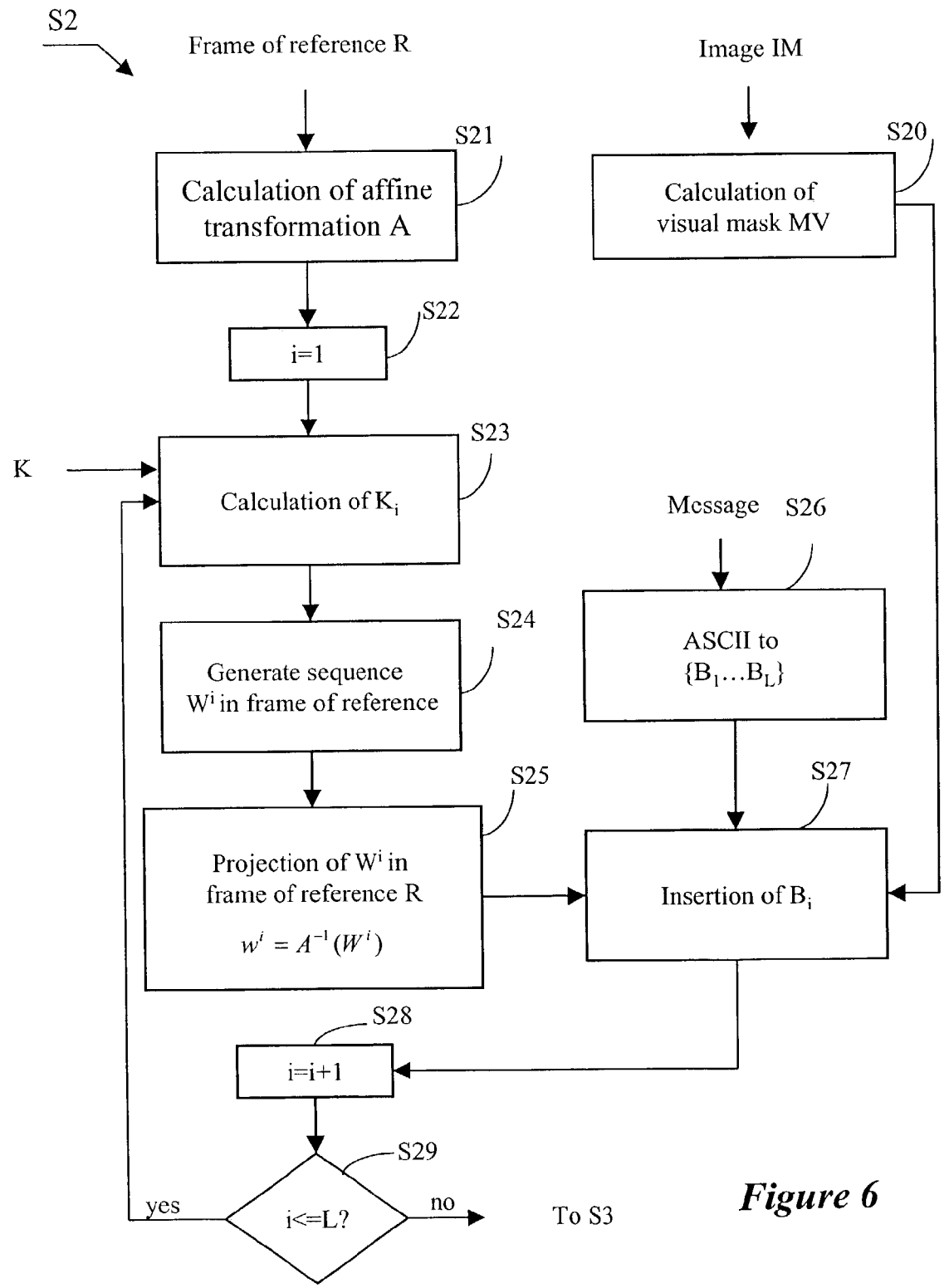
FIG. 6 represents an embodiment of a method of message insertion in an image, included in the encoding method.

The insertion step S2 is detailed with reference to FIG. 6, in the form of an algorithm comprising steps S20 to S29.

The insertion of the message in the image is carried out by spectrum spreading in the spatial domain, while being adapted to the coordinate system dependant on the image, in such a manner as to be able to extract the message later without re-localizing.

Step S20 is the calculation of a psycho-visual mask MV on the image IM. The psycho-visual mask MV represents, at each pixel of the image, the maximum value by which it is allowable to modify the value of the pixel without this being perceptible. The term "Just Noticeable Difference" (JND) is used for this.

This calculation is conventional. For example the article "A perceptually tuned subband image coder based on the measure of just noticeable distortion profile" by de C. H. Chou and Y. C. Li, in IEEE Trans. On circuits and systems for video technology, 5(6): 467-476, 1995, describes such a method.

In order for the points of the coordinate system R not to be modified by the insertion of the message, the values of the psycho-visual mask MV are set to zero in the neighborhood of each point of the coordinate system R.

Step S21 is the calculation of an affine transformation A between the coordinate system R and the orthonormalized coordinate system (N1, N2, N3). Let $(x_1, y_1)$, $(x_2, y_2)$ and $(x_3, y_3)$ be the respective coordinates of the points $P_1$, $P_2$ and $P_3$, in the orthonormalized coordinate system.

The affine transformation is sought for which the points N1, N2 and N3 are the images of the points P1, P2 and P3 by virtue of that transformation. This is expressed by the following set of equations:

$a_{11} \cdot x_1 + a_{12} \cdot y_1 + b_1 = 0$ $a_{21} \cdot x_1 + a_{22} \cdot y_1 + b_2 = 0$ $a_{11} \cdot x_2 + a_{12} \cdot y_2 + b_1 = 0$ $a_{21} \cdot x_2 + a_{22} \cdot y_2 + b_2 = D_0$ $a_{11} \cdot x_3 + a_{12} \cdot y_3 + b_1 = D_0$ $a_{21} \cdot x_3 + a_{22} \cdot y_3 + b_2 = 0$ It is necessary to solve this set of six equations with six unknowns $(a_{11}, a_{12}, a_{21}, a_{22}, b_1, b_2)$.

The result is:

$a_{11} = \delta \cdot (y_2 - y_1)$ $a_{12} = \delta \cdot (x_1 - x_2)$ $a_{21} = \delta \cdot (y_1 - y_3)$ $a_{22} = \delta \cdot (x_3 - x_1)$ $b_1 = \delta \cdot (x_2 \cdot y_1 - x_1 \cdot y_2)$ $b_2 = \delta \cdot (x_1 \cdot y_3 - x_3 \cdot y_1)$ with $\delta = D_0 / ((x_3 - x_1) \cdot (y_2 - y_1) - (x_2 - x_1) \cdot (y_3 - y_1))$ At the following step S22, a counter i of the number of bits of the message is initialized to the value one.

The following step S23 is the generation of a key $K_i$, for the current bit to insert $B_i$, based on a secret key K.

The key $K_i$ makes it possible to generate orthogonal pseudo-random sequences when the number L of bits to insert is greater than one. More particularly, in order for the insertion to be robust to cropping of a part of the image, each bit inserted must be spread over the entire image, and not localized spatially, as is the case conventionally for spatial methods.

The pseudo-random sequences $W^i$ must be de-correlated from each other, that is to say orthogonal, to make the decoding possible. For this, a specific key $K_i$ for each sequence $W^i$ is selected. For example, the keys $K_i$ are determined according to the formula:

$K_i = K + i \cdot Q_1$

Where $Q_1$ is a predetermined constant greater than the number of bits L to insert.

The following step S24 is the generation of a pseudo-random sequence $W^i$, based on the key $K_i$, for the current bit $B_i$ to insert. This sequence is generated in the orthonormalized coordinate system.

Figure 7:
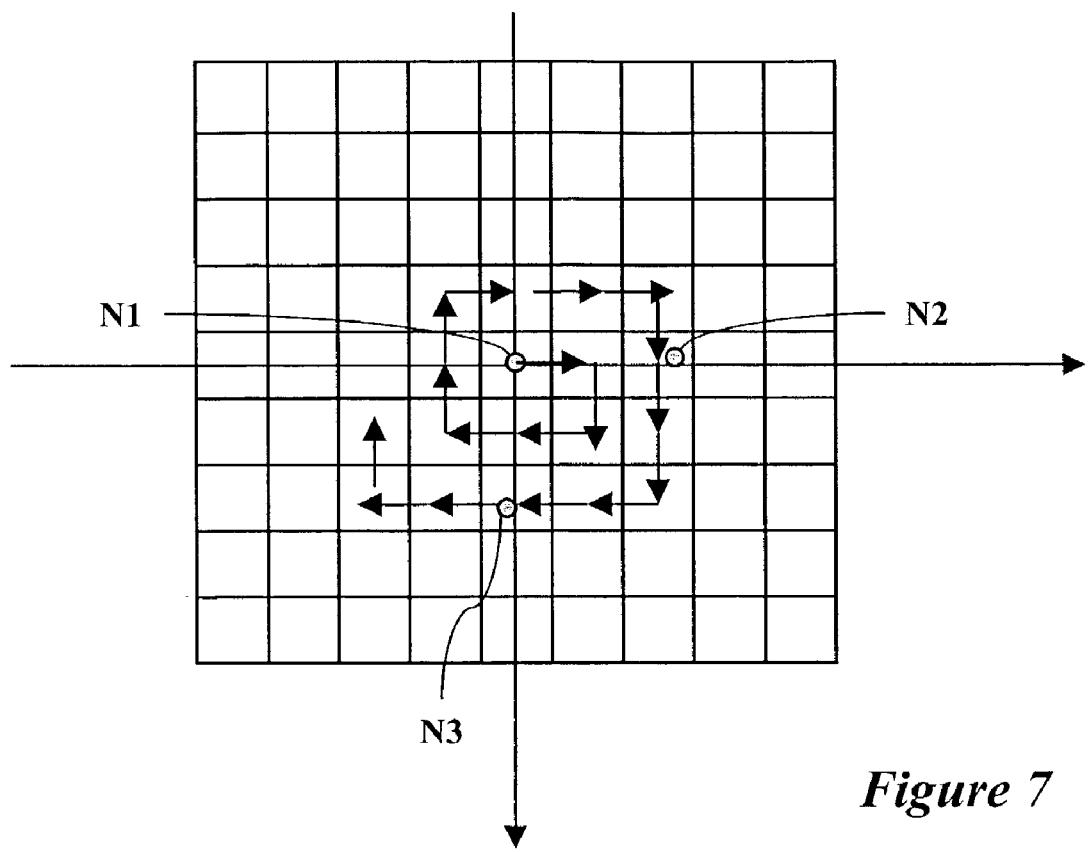
FIG. 7 represents an order of scanning used during the insertion.

Conventionally, pseudo-random sequences are generated block by block of the image. However, according to the invention, the insertion must be robust to cropping of the image. For this, the pseudo-random sequences are generated here in one of the following manners:

- a pseudo-random sample is generated for each point of the image, in the orthonormalized coordinate system, as a function of the key $K_i$. If (x, y) are the coordinates of a point in the orthonormalized coordinate system, a pseudo-random picking according to a predetermined law is carried out with the key $K_i(x, y) = K_i + Q_2 \cdot x + y$, where $Q_2$ is a constant.
- a series of pseudo-random numbers is generated by a conventional generator, using the key $K_i$, and by arranging them in the orthonormalized coordinate system in the order of scanning, in a spiral path, as shown in FIG. 7. The pseudo-random numbers are associated with the coefficients of the image in the order indicated, starting with the origin of the coordinate system of reference.

The samples of the sequence $W^i$ are generated according to a binomial law on $\{-1, 1\}$ or according to a uniform law over the interval [0, 1] or else according to a Gaussian law of nil mean and variance equal to one.

The following step S25 is the projection of the current pseudo-random sequence $W^i$ into the coordinate system R of the image.

The object of this step is to obtain a matrix $w^i$, of the same size as the initial image and of which each point is the affine projection of the corresponding matrix $W^i$ in the orthonormalized coordinate system. We thus have the relationship: $w^i = A^{-1}(W^i)$, where $A^{-1}$ is the affine transformation which is the reverse of that determined at step S21.

It should be noted that the transformation A is reversible through construction of the coordinate system $(P_1, P_2, P_3)$ since the points are chosen such that the vectors $P_1P_2$ and $P_1P_3$ are not co-linear.

It should be noted that the matrices $W^i$ and $w^i$ are discreet representations. After having applied the reverse transformation $A^{-1}$, it is necessary to re-sample the signal projected on the discrete grid of the image. To do this, a conventional interpolation method is used, for example a bi-linear or bi-cubic interpolation.

Figure 8:
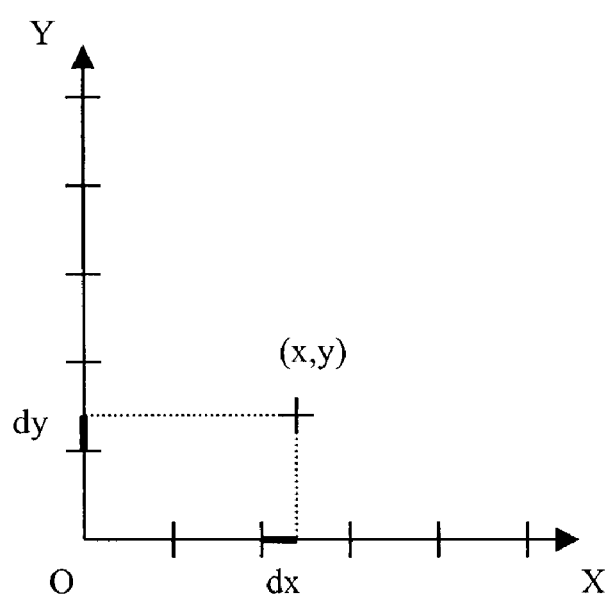
FIG. 8 represents an interpolation method used during the insertion.

A bi-linear interpolation is now detailed with reference to FIG. 8. A pixel of coordinates (p, q) is considered in the coordinate system linked to the image IM. The value $w^i(p,q)$ must be determined.

To do this, the image (x, y) of the point (p, q) given by the affine transformation A is calculated:

$$(x, y)=A((p, q))$$

where x and y are real numbers.

Let Int[ . . . ] be the integer part of a real number.

The coefficient $w^i(p, q)$ is given by the formula:

$$w^i(p, q)=(1-dx)\cdot(1-dy)\cdot W^i(a, b)+dx\cdot(1-dy)\cdot W^i(a+1, b)+(1-dx)\cdot dy\cdot W^i(a, b+1)+dx\cdot dy\cdot W^i(a+1, b+1)$$

where $a=Int[x]$, $b=Int[y]$, $dx=x-a$ and $dy=y-b$.

The pseudo-random sequence $w^i$ is thus obtained which contains as many coefficients as there are pixels in the image IM.

Step S26 is the transformation of the alphanumeric message into binary code, for example by representing an alphanumeric character over eight bits. The value −1 is associated with each bit equal to zero and the value 1 is associated with each bit equal to 1, which forms a chain $(B_1, \ldots, B_L)$.

The following step S27 is the actual insertion of a bit $B_i$ in the image. The result of this insertion is the image comprising the pixels $I^*_{p,q}$ given by the formula:

$$I^*_{p,q}=I_{p,q}+B_i\cdot MV_{p,q}\cdot w^i(p, q)$$

It should be noted that $MV_{p,q}$ represents the coefficient of the psycho-visual mask corresponding to the pixel $I_{p,q}$. The application of the psycho-visual mask makes it possible not to insert the symbol in the neighborhood of the points of the coordinate system R.

At the following step S28, the parameter i is incremented by one unit in order to consider the following bit to be inserted. Step S28 is followed by step S29 which is a test to determine whether the parameter i is less than or equal to L. If the response is positive, this step is followed by the step S23 already described.

When the response is negative at step S29, the insertion is terminated.

In the particular case in which a single bit is to be inserted in the image, this bit is considered to be equal to 1. There is then no loop on the parameter i and it is not necessary to calculate a key $K_i$ based on the key K. The key K is then utilized instead of the key $K_i$.

Step S3 of verifying the coordinate system is now detailed with reference to FIG. 9, in the form of an algorithm comprising steps S30 to S33.

The object of step S3 is to verify that it will be possible to find the coordinate system of the image again at the time of the later decoding.

Step S30 is the application of a predetermined distortion to the image I* in which the message was inserted. The distortion is for example a compression followed by a decompression. This step is optional.

The following step S31 is a detection of three interest points Q1, Q2 and Q3 in the current image, which is either the image I*, or the image I* after distortion. This step is identical to the step S10 already described.

The following step S32 is the comparison of the three interest points previously determined with the points of the coordinate system R. The order of the points is taken into account in the comparison.

If the points Q1, Q2 and Q3 are not the points of the coordinate system R, step S32 is followed by step S33 at which the image in course of being processed is modified imperceptibly. The image in course of processing is here the image I* in which the message has been inserted, without distortion. For example, a high-pass filtering is carried out around the points of the coordinate system R, to increase the contrast. As a variant, a high-pass filtering is carried out around the interest points determined at step S31 and which are not in the coordinate system R.

Step S33 is followed by the previously described step S30.

When the response is positive at step S32, the insertion of the message in the image is completely terminated and the image I' is determined.

In the above, the insertion of a message formed of alphanumeric characters was described. As a variant, it is possible to insert a single bit of information in the image. In this case the decoding is a verification of the key K.

Figure 10:
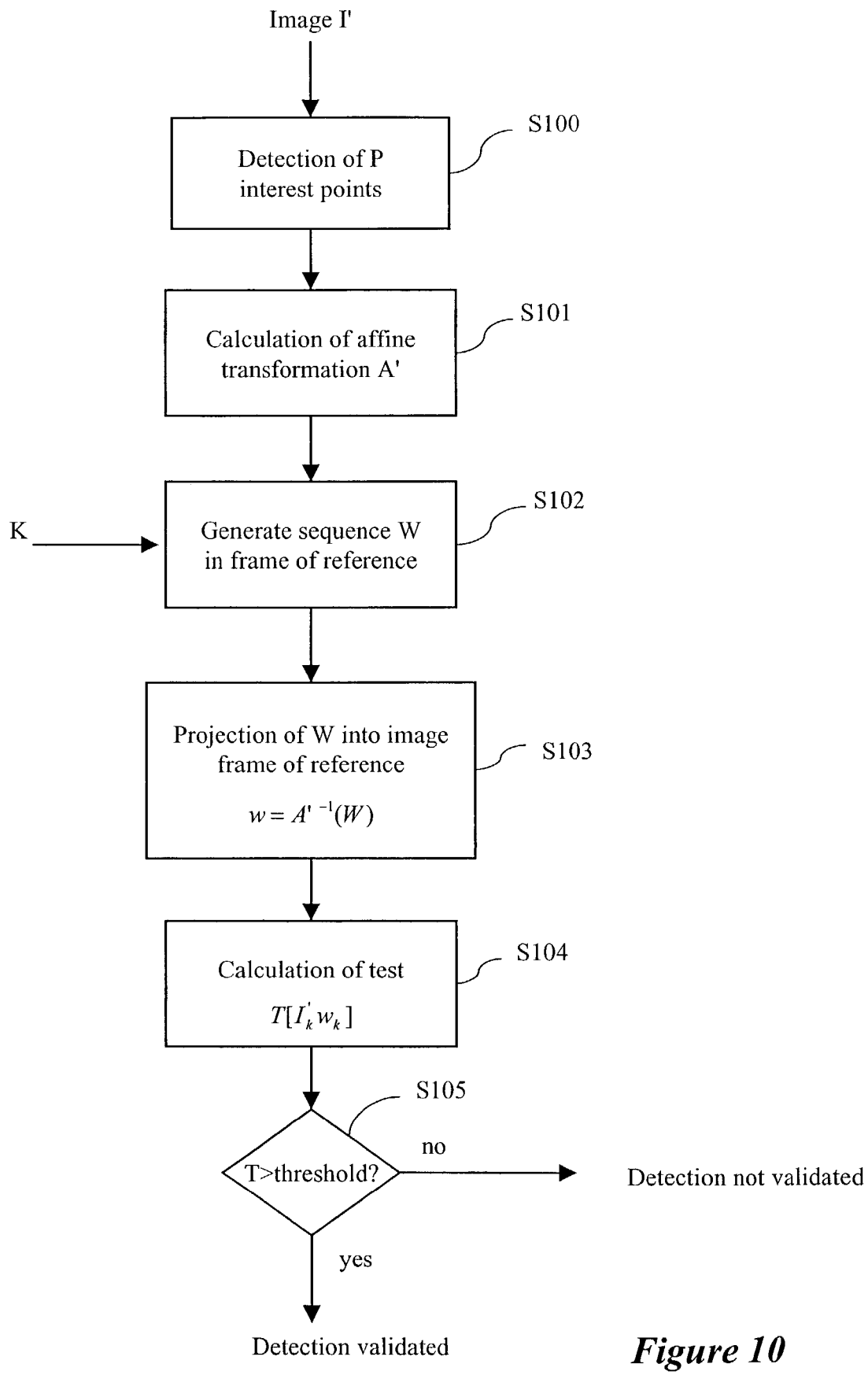
FIG. 10 represents a first embodiment of a method of extracting a message in an image.

FIG. 10 represents a method of decoding the image I', which is a verification of the key K, in the form of an algorithm comprising the steps S100 to S105.

The image I' may have undergone distortions such as compression or geometric distortion: cropping, rotation, and change of scale.

Figure 11:
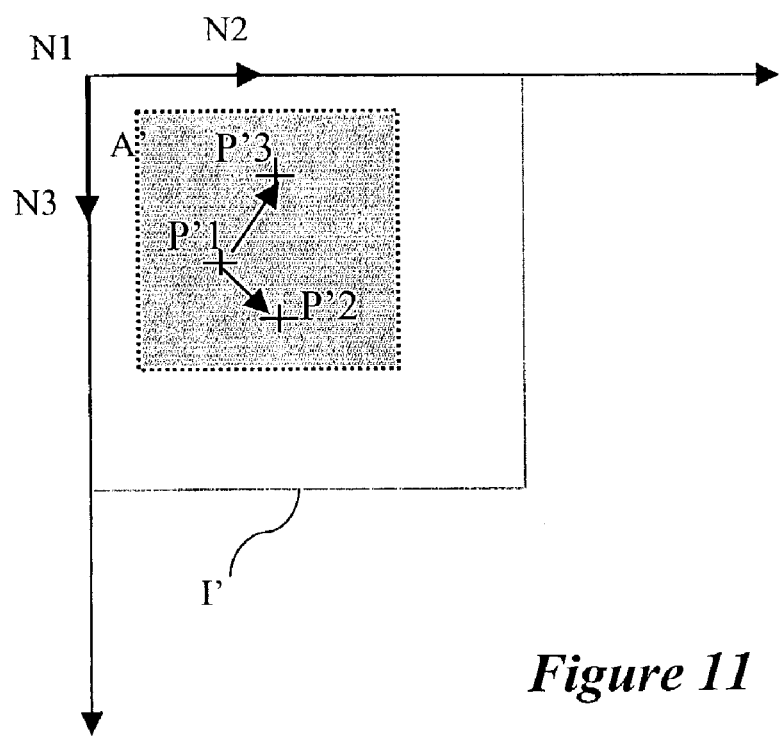
FIG. 11 represents an image in which a message is to be extracted.

For example, as shown in FIG. 11, the image I' to be decoded has undergone a cropping operation with respect to the initial image. A vertical band of width yd and a horizontal band of width xd have been cropped (FIG. 5).

On decoding, it is assumed that the distortions undergone by the image are not known.

The coordinate system of reference (N1, N2, N3) is considered identical to that considered at the time of the encoding.

Step S100 is the detection of P interest points in the image I', where P is the number of points of the coordinate system, here three. The detection is carried out in a manner identical to that of the insertion (step S10), without any other additional information. The result of this step is the points P'$_1$, P'$_2$ and P'$_3$, which are identical to the points P$_1$, P$_2$ and P$_3$ from the point of view of the content of the image, but which do not necessarily have the same coordinates in the coordinate system of reference. In the example represented in FIG. 11, the points P'$_1$, P'$_2$ and P'$_3$ are translated with respect to the points P$_1$, P$_2$ and P$_3$ due to the cropping operation. A rotation could also have been applied, for example in combination with the translation.

The points P'$_1$, P'$_2$ and P'$_3$ form a coordinate system R'.

The following step S101 is the calculation of an affine transformation A' between the coordinate system R' and the coordinate system of reference (N1, N2, N3), in a similar manner to the step S21 described for the insertion. The parameter D0 is known at the time of the decoding.

The following step S102 is the calculation of a pseudo-random sequence W based on the secret key K. This step is identical to the step S24 described for the insertion.

The following step S103 is the projection of the previously determined pseudo-random sequence W into the coordinate system R' of the image determined at step S100. This step is similar to step S25 already described. Its result is a pseudo-random sequence w'.

The following step S104 is the calculation of a detection value T based on the correlation between the current image I' and the pseudo-random sequence w'.

For example, the detection value T is the mean of the random variable Z=I'·w'.

This type of calculation is conventional and is for example detailed by W. Zeng and B. Liu in "On resolving rightful ownership of digital data images by invisible watermarks" in Proc. ICIP, pages 552-555, Dallas, Tex., November 1997.

The following step S105 is the comparison of the detection value T with a predetermined threshold. If the number of samples of the image which are tested is large enough, the random variable Z follows a Gaussian law. The threshold used is then directly linked to the probability of error.

For more detail about the calculations of probability, reference may be made to the work of A. Papoulis entitled "Probability and Statistics", Prentice-Hall, 1990.

If the response is negative at step S105, then the detection is not validated.

If the response is positive at step S105, then the detection is validated.

Figure 12:
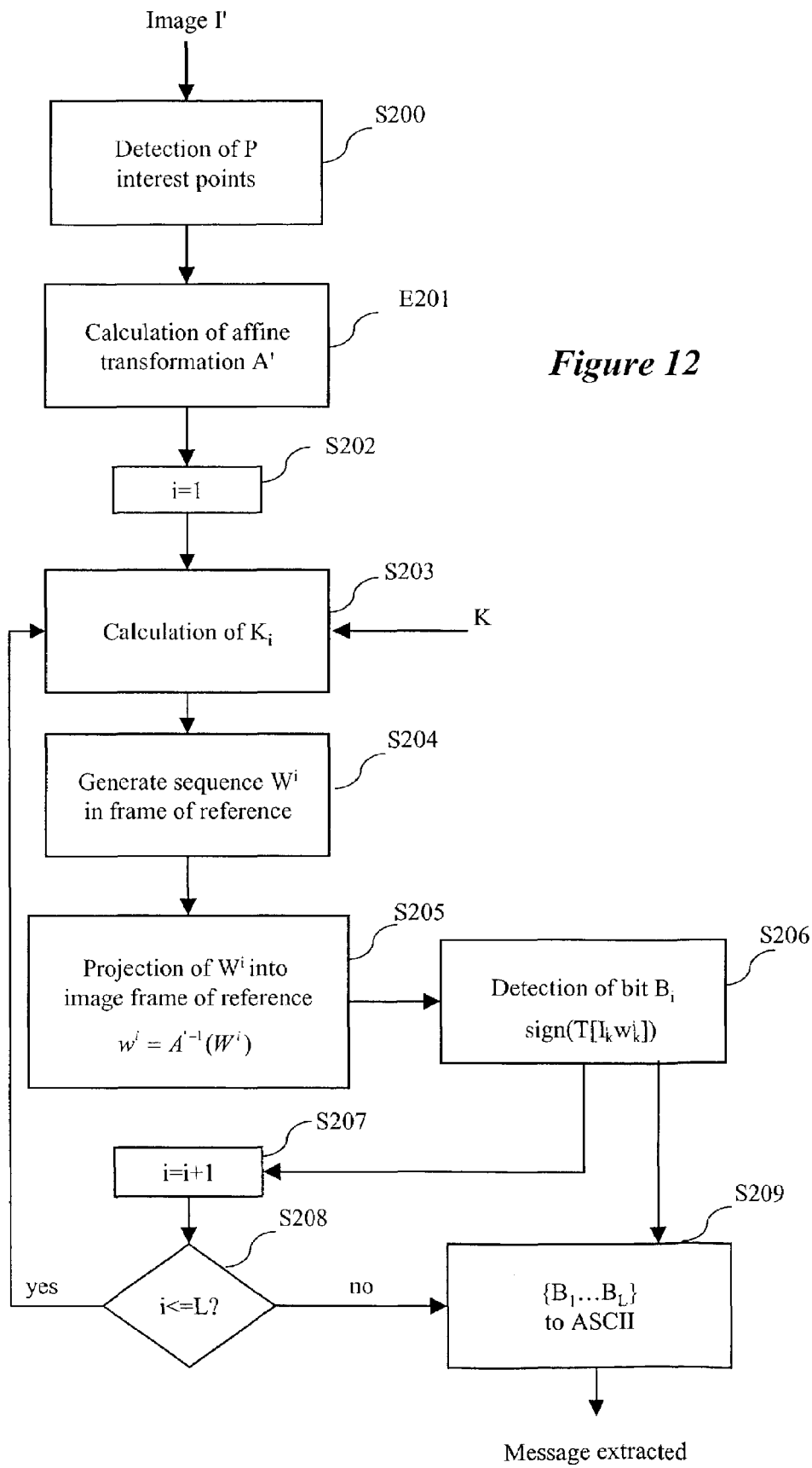
FIG. 12 represents a second embodiment of a method of extracting a message in an image.

FIG. 12 represents a method of decoding in the case in which the message which was inserted comprises a plurality of bits of information, in the form of an algorithm comprising steps S200 to S209.

Step S200 is the detection of P interest points in the image I', where P is the number of points of the coordinate system, here three. The detection is carried out in a manner identical to that of the insertion (step S10), without any other additional information. As for the preceding decoding mode, these points form a coordinate system R'.

The following step S201 is the calculation of an affine transformation A' between the coordinate system R' and the coordinate system (N1, N2, N3), in a similar manner to the step S21 described for the insertion.

The following step S202 is an initialization at which a parameter i representing the current information bit to detect is initialized to one. It is assumed here that the number L of bits to detect is known. It is to be noted that it is not necessary to know the number L in the case in which the image has undergone only very slight distortions. In this case, the probability of error in each bit detected makes it possible to deduce the length of the message a posteriori.

The following step S203 is the calculation of a key $K_i$ based on the secret key K. This step is identical to the step S23 described for the insertion.

The following step S204 is the calculation of a pseudo-random sequence $W^i$ in the orthonormalized coordinate system. This step is similar to step S24 already described.

The following step S205 is the projection of the previously determined pseudo-random sequence $W^i$ into the coordinate system R' of the image determined at step S200. This step is similar to step S25 already described. Its result is a pseudo-random sequence $w'^i$.

The following step S206 is the detection of the bit $B_i$. For this, a detection value is calculated, for example the value T as at the step S104 described previously.

The sign of the value T provides the value of the bit $B_i$.

As a variant, it is possible to consider another statistical test, such as the correlation between I' and $w'^i$.

According to another variant, a plurality of detection tests are used and the result of the best detection is selected for each bit. The detection is thus more robust to the distortions which the image may have undergone between the insertion of the message and its detection.

At the following step S207, the parameter i is incremented by one unit in order to consider the following bit to be extracted. Step S207 is followed by step S208 which is a test to determine whether the parameter i is less than or equal to L. If the response is positive, this step is followed by the step S203 already described.

When the response is negative at step S208, the L bits have been extracted and this step is followed by the step S209 at which the L extracted bits are converted into ASCII characters. The message is thus reconstituted.

Figure 13:
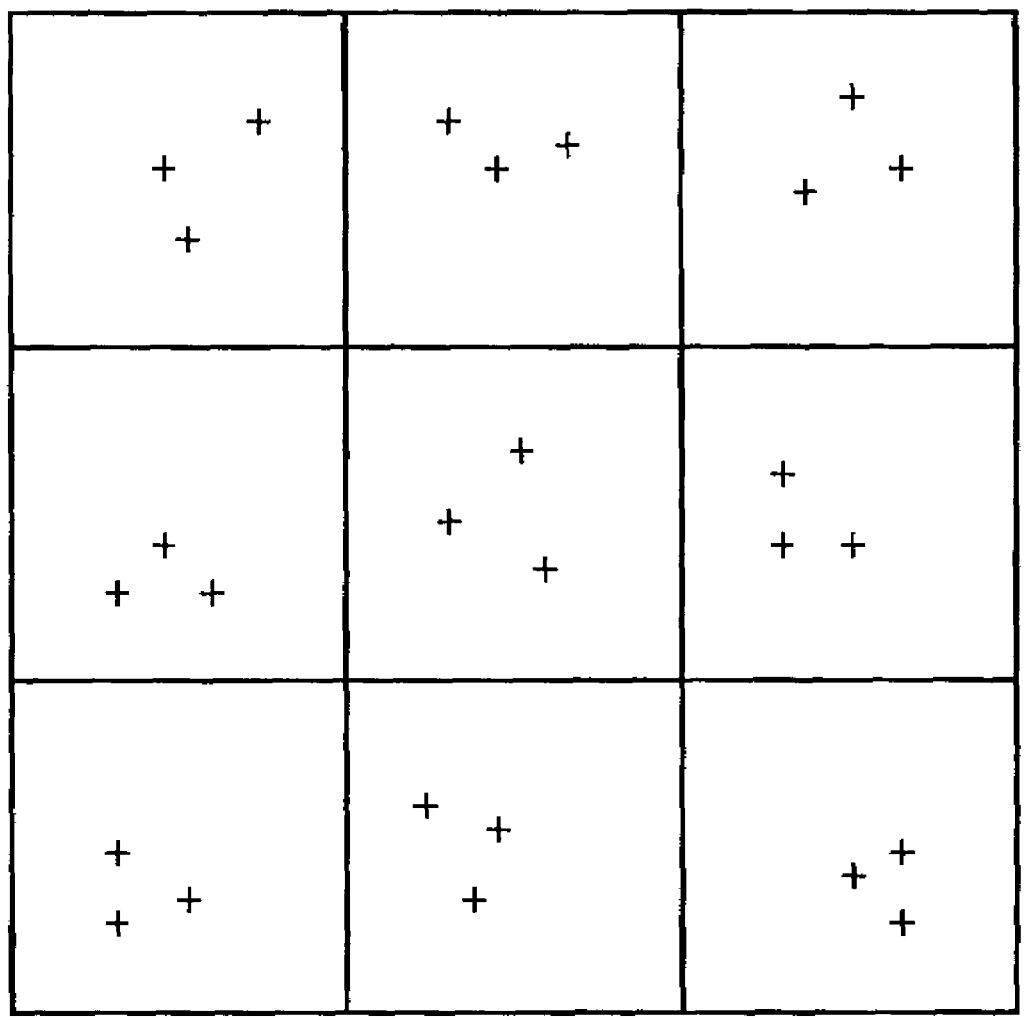
FIG. 13 is a variant embodiment of the insertion method.

FIG. 13 illustrates a variant embodiment according to which a plurality of coordinate systems are formed in the image. This variant is more robust to cropping of the image after insertion of the message. It applies in particular to the case in which the image comprises a plurality of regions of interest.

Adjacent and disjoint blocks are formed in the image, and a coordinate system is determined in each block.

The relative distance between the points of the same coordinate system must be less than the minimum distance with respect to the points of the other coordinate systems.

It should be noted that the insertion capacity for an image is divided by the number of blocks, with respect to the embodiment previously described.

Of course, the present invention is in no way limited to the embodiments described and represented, but encompasses, on the contrary, any variant form within the capability of the person skilled in the art.

The invention claimed is:

1. A method of inserting a multiple bit message in an image, characterized in that it comprises the steps of:
    selecting a predetermined number of points in the image as a function of predetermined criteria, so as to form a coordinate system in the image,
    calculating an affine transformation between a predetermined coordinate system and the coordinate system formed in the image,
    generating a pseudo-random sequence for each symbol of the multiple bit message to be inserted, in the predetermined coordinate system,
    projecting each pseudo-random sequence into the coordinate system formed in the image, by affine transformation, and
    inserting each symbol of the multiple bit message to be inserted, as a function of its respective projected pseudo-random sequence; wherein said selecting comprises
    detecting a first set of interest points, the first set comprising a first number of points, the interest points being ordered,
    selecting the points of the coordinate system formed in the image, among the points of interest, the coordinate system comprising a second number of points less than or equal to the first number of points,
    verifying that the points of the coordinate system formed in the image are the first interest points in the order, and if the response is negative,
    modifying the image around the points of the coordinate system formed in the image, such that an additional detection of a second set of interest points, the second set comprising the second number of points, provides the points of the coordinate system formed in the image.

2. A method of insertion according to claim 1, characterized in that it further comprises the steps of:
    detecting a third set of interest points in the image in which the message has been inserted, the third set comprising the same number of points as the coordinate system formed in the image, comparing the interest points of the third set with the points of the coordinate system formed in the image, and, if there is no identity between the interest points of the third set and the points of the coordinate system formed in the image, modifying the image in which the message has been inserted, in order for there to be identity between the interest points of the third set and the points of the coordinate system formed in the image.

3. A method of insertion according to claim 2, characterized in that it further comprises the step of:

applying a distortion to the image in which the message has been inserted, prior to the detection of a third set of interest points.

4. A method of insertion according to claim 1, characterized in that the modification of the image is a low-pass filtering operation around the interest points which are not in the coordinate system formed in the image.

5. A method of insertion according to claim 1, characterized in that the modification of the image is a high-pass filtering operation around the points of the coordinate system formed in the image.

6. A method of insertion according to claim 1, characterized in that that generating a pseudo-random sequence comprises generating a pseudo-random sample for each point of the image, the sample being determined as a function of the coordinates of the point in the predetermined coordinate system.

7. A method of insertion according to claim 1, characterized in that that generating a pseudo-random sequence comprises generating a series of pseudo-random numbers and associating these numbers with the points of the image in a spiral scanning path starting with the origin of the predetermined coordinate system.

8. A method of insertion according to claim 1, characterized in that the insertion of a given symbol is carried out by the addition of the projected pseudo-random sequence corresponding to said given symbol, the pseudo-random sequence having been modulated by the symbol, and in that the insertion is carried out over the entire image except in the neighborhood of the points of the coordinate system formed in the image.

9. A method of extraction of a message inserted in an image by the method according to claim 1, characterized in that it comprises the steps of:

selecting a set of points in the image as a function of predetermined criteria, so as to form a coordinate system in the image, calculating an affine transformation between the coordinate system formed in the image and a predetermined coordinate system, generating a pseudo-random sequence for each symbol of the message to be extracted, in the predetermined coordinate system, projecting each pseudo-random sequence into the coordinate system formed in the image, by reverse affine transformation, extracting each symbol of the message, as a function of its respective projected pseudo-random sequence.

10. An extraction method according to claim 9, characterized in that the extraction comprises calculating a detection value for each symbol to be extracted and comparing the detection value with a predetermined threshold.

11. An extraction method according to claim 10, characterized in that the extraction comprises a plurality of detection tests and the taking into account of the best test, for each symbol to extract.

12. A computer-readable medium embodying a computer program, the computer program comprising computer executable instructions for implementing the method according to claim 1.

13. A device for the insertion of a multiple bit message in an image, characterized in that it comprises:

means for selecting a predetermined number of points in the image as a function of predetermined criteria, so as to form a coordinate system in the image, means for calculating an affine transformation between a predetermined coordinate system and the coordinate system formed in the image, means for generating a pseudo-random sequence for each symbol of the multiple bit message to be inserted, in the predetermined coordinate system, means for projecting each pseudo-random sequence in the coordinate system formed in the image, by affine transformation, and means for inserting each symbol of the multiple bit message to be inserted, as a function of its respective projected pseudo-random sequence; said means for selecting comprising means for detecting a first set of interest points, the first set comprising a first number of points, the interest points being ordered, means for selecting the points of the coordinate system formed in the image, among the points of interest, the coordinate system comprising a second number of points less than or equal to the first number of points, means for verifying that the points of the coordinate system formed in the image are the first interest points in the order, and means for modifying the image around the points of the coordinate system formed in the image if the verification is negative, such that an additional detection of a second set of interest points, the second set comprising the second number of points, provides the points of the coordinate system formed in the image.

14. An insertion device according to claim 13, characterized in that it further comprises:

means for detecting a third set of interest points in the image in which the message has been inserted, the third set comprising the same number of points as the coordinate system formed in the image, means for comparing the interest points of the third set with the points of the coordinate system formed in the image, and, if identity does not exist between the interest points of the third set and the points of the coordinate system formed in the image, means for modifying the image in which the message has been inserted, in order for there to be identity between the interest points of the third set and the points of the coordinate system formed in the image.

15. An insertion device according to claim 14, characterized in that it further comprises means for applying a distortion to the image in which the message has been inserted, prior to the detection of a third set of interest points.

16. An insertion device according to claim 13, characterized in that the means for modification the image are adapted to apply a low-pass filtering operation around the interest points which are not in the coordinate system formed in the image.

17. A device for insertion according to claim 13, characterized in that the means for modifying the image are adapted to apply a high-pass filtering operation around the points of the coordinate system formed in the image.

18. An insertion device according to claim 13, characterized in that that the means for generating a pseudo-random sequence are adapted to generate a pseudo-random sample for each point of the image, the sample being determined as a function of the coordinates of the point in the predetermined coordinate system.

19. An insertion device according to claim 13, characterized in that that the means for generating a pseudo-random sequence are adapted to generate a series of pseudo-random numbers and to associate these numbers with the point of the image in a spiral scanning path starting with the origin of the predetermined coordinate system.

20. An insertion device according to claim 13, characterized in that the means for inserting a given symbol are adapted to carry out the addition of the projected pseudo-random sequence corresponding to said given symbol, the pseudo-random sequence having been modulated by the symbol, and in that the means for insertion are adapted to carry out this insertion over the entire image except in the neighborhood of the points of the coordinate system formed in the image.

21. A device for extracting a message inserted in an image by the device according to claim 13, characterized in that it comprises:
  means for selecting a set of points in the image as a function of predetermined criteria, so as to form a coordinate system in the image,
  means for calculating an affine transformation between the coordinate system formed in the image and a predetermined coordinate system,
  means for generating a pseudo-random sequence for each symbol of the message to be extracted, in the predetermined coordinate system,
  means for projecting each pseudo-random sequence in the coordinate system formed in the image, by reverse affine transformation,
  means for extracting each symbol of the message, as a function of its respective projected pseudo-random sequence.

22. An extraction device according to claim 21, characterized in that the means for extraction comprise means for calculating a detection value for each symbol to be extracted and means for comparing the detection value with a predetermined threshold.

23. An extraction device according to claim 22, characterized in that the means for extraction are adapted to implement a plurality of detection tests and to take into account the best test, for each symbol to extract.

24. An insertion device according to claim 21, characterized in that the means for selecting, calculating, generating, projecting and extracting are incorporated in:
  a microprocessor,
  a read only memory, comprising a program for processing the data, and
  a random access memory comprising registers adapted to record variables modified during the execution of said program.

25. An insertion device according to claim 13, characterized in that the means for selecting, calculating, generating, projecting and inserting are incorporated in:
  a microprocessor,
  a read only memory, comprising a program for processing the data, and
  a random access memory comprising registers adapted to record variables modified during the execution of said program.

* * * * *

UNITED STATES PATENT AND TRADEMARK OFFICE
CERTIFICATE OF CORRECTION

Figure 9:
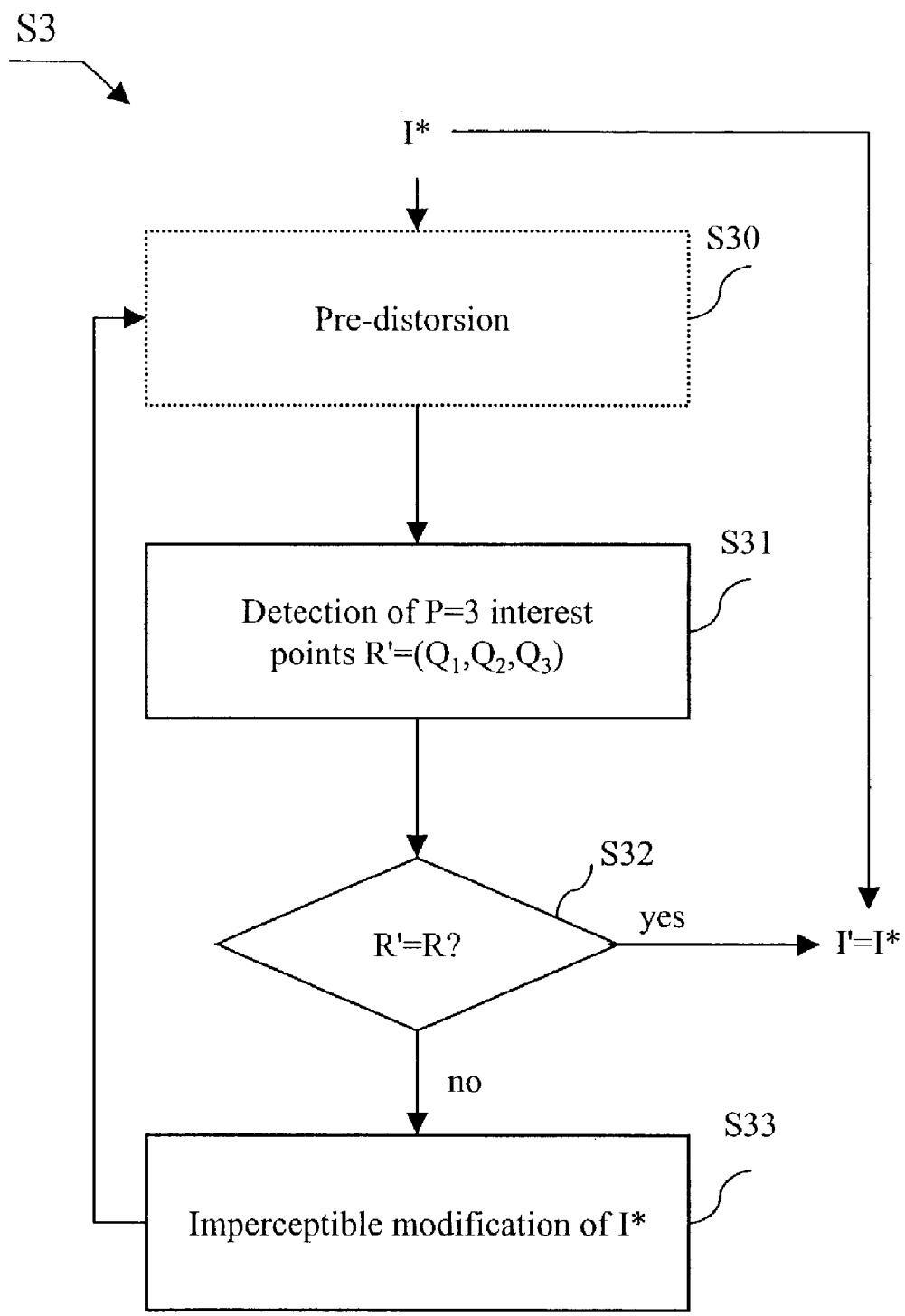
FIG. 9 represents an embodiment of a verification method, included in the encoding method.

PATENT NO. : 7,330,560 B2
APPLICATION NO. : 10/461416
DATED : February 12, 2008
INVENTOR(S) : Ioana Donescu It is certified that error appears in the above-identified patent and that said Letters Patent is hereby corrected as shown below:

| | |
|---|---|
| Sheet 7, Fig. 9, | "Pre-distorsion" should read --Pre-distortion--. |
| Col. 2, line 9, | "of" should read --of the--. |
| Col. 3, line 49, | "system" should read --system,--. |
| Col. 5, line 14, | "EMBODIMENT" should read --EMBODIMENTS--. |
| line 40, | "be" should read --be an--. |
| Col. 6, line 23, | "systemin" should read --system in--. |
| line 47, | "systemin" should read --system in--. |
| Col. 8, line 12, | "are:N1(0,0)," should read --are: N1(0,0),--. |
| line 41, | "This" should read --this--. |
| line 56, | "a" should read --at--. |
| Col. 9, line 29, | "de" should be deleted. |
| Col. 12, line 59, | "parameter D0" should read --parameter $D_0$--. |
| Col. 14, line 47, | "prises" should read --prises:--. |
| Col. 15, line 26, | "that" (second occurrence) should be deleted. |
| line 32, | "that" (second occurrence) should be deleted. |
| Col. 16, line 26, | "comprising" should read --comprising:--. |
| line 64, | "modification" should read --modifying--. |

UNITED STATES PATENT AND TRADEMARK OFFICE
CERTIFICATE OF CORRECTION

PATENT NO. : 7,330,560 B2
APPLICATION NO. : 10/461416
DATED : February 12, 2008
INVENTOR(S) : Ioana Donescu It is certified that error appears in the above-identified patent and that said Letters Patent is hereby corrected as shown below:

Col. 17, line 6,  "that" (second occurrence) should be deleted.

line 12,  "that" (second occurrence) should be deleted.

line 14,  "point" should read --points--.

Signed and Sealed this

Nineteenth Day of August, 2008

JON W. DUDAS
*Director of the United States Patent and Trademark Office*